United States Patent

Kondo et al.

[11] Patent Number: 5,182,850
[45] Date of Patent: Feb. 2, 1993

[54] PARTS ASSEMBLING DEVICE

[75] Inventors: Isao Kondo; Yosio Taki, both of Nagano, Japan

[73] Assignee: Seiko Epson Corporation, Tokyo, Japan

[21] Appl. No.: 805,961

[22] Filed: Dec. 12, 1991

[30] Foreign Application Priority Data

Jan. 25, 1991 [JP] Japan .................................. 3-25681

[51] Int. Cl.⁵ .......................................... B23D 49/00
[52] U.S. Cl. ......................................... 29/784; 29/799
[58] Field of Search ................. 29/429, 430, 705, 784, 29/783, 791, 799

[56] References Cited

U.S. PATENT DOCUMENTS

| | | | |
|---|---|---|---|
| 3,066,396 | 12/1962 | Erkelens et al. | 29/784 X |
| 4,619,043 | 10/1986 | Takahashi et al. | |
| 4,703,558 | 11/1987 | Makinen | |
| 4,787,141 | 11/1988 | Miyazaki et al. | 29/799 X |
| 4,971,189 | 11/1990 | Fleming et al. | |
| 5,065,499 | 11/1991 | Luciano et al. | 29/799 |
| 5,079,829 | 1/1992 | Yoshiji et al. | 29/799 X |

FOREIGN PATENT DOCUMENTS

| | | |
|---|---|---|
| 2166857 | 5/1976 | Fed. Rep. of Germany . |
| 3700192 | 12/1987 | Fed. Rep. of Germany . |
| 58-182708 | 2/1984 | Japan . |
| 161038 | 8/1985 | Japan .................................. 29/799 |
| 61-109635 | 10/1986 | Japan . |
| 1-88240 | 7/1989 | Japan .................................. 29/784 |

*Primary Examiner*—Timothy V. Eley
*Attorney, Agent, or Firm*—Sughrue, Mion, Zinn, Macpeak & Seas

[57] ABSTRACT

A parts assembling device in which parts assembling units can be readily changed and rearranged in a short period of time. The parts assembling unit includes a parts carrying unit including pallet carrying belts and electrically-supplying means for supplying an electrical power to a parts assembling unit having one side connectred to the parts assembling unit, a parts assembling unit movably formed so as to be connected to the one side of the parts carrying unit and having a pallet positioning means capable of being placed at an immediately lower portion of the pallet carrying belts under a state in which the parts assembling unit is connected to the parts carrying unit, and assembling means for assembling parts on workpieces mounted on pallets.

5 Claims, 3 Drawing Sheets

PARTS ASSEMBLING DEVICE

BACKGROUND OF THE INVENTION

The present invention relates to a parts assembling unit including a parts carrying unit and a parts assembling unit.

In recent years, automatic parts assembling devices employing robots have been widely utilized from the point of view of labor reduction and/or quality control.

These devices are formed so that a line of robots is arranged in the order of working processes at the side of a parts-carrying line, and the parts are assembled on workpieces mounted on pallets.

However, in the case where a problem arises in one of the parts assembling robots in a line of such assembling devices, the influence on other portions of the assembly line is much larger than in a conventional parts assembly line. Further, there have been problems in that every time there is a change in the type of workpiece, the parts assembling robots must be changed to new parts assembling robots suitable therefore, and much time and labor are required for the change in the arrangement of the parts assembling robots in accordance with the increase or decrease of the number of working processes and the change of the assembling sequence or the like, so that the rate of operation is seriously deteriorated and the overall costs required as the number of changes are increased.

SUMMARY OF THE INVENTION

The present invention was made in view of the above problems. A specific object of the invention is the provision of a parts assembling device in which parts assembling units can be readily changed and rearranged in a short period of time.

In order to obtain the above and other objects, a parts assembling device according to the present invention comprises a parts carrying unit including pallet carrying belts and an electricity-supplying means for feeding parts to a parts assembling unit having one side connected to the parts assembling unit, a parts assembling unit movably formed so as to be connected to the one side of the parts carrying unit and having a pallet positioning means capable of being placed at an immediately lower portion of the pallet carrying belts under a state in which the parts assembling unit is connected to the parts carrying unit, and assembling means for assembling parts on workpieces mounted on pallets.

The present invention constructed as described above makes it possible for the pallet positioning mechanism of the parts assembling unit side to be located just below the pallet carrying belts provided at the side of the parts carrying unit so as to assemble the parts on the workpieces during the connection of the parts assembling unit and the parts carrying unit and such that the respective parts assembling units are, when the type of workpiece is changed, readily rearranged in a short time in accordance with the type of parts and assembly sequence.

DESCRIPTION OF THE PREFERRED EMBODIMENTS

Preferred embodiment of the present invention will now be described with reference to the accompanying drawings.

Figure 1:
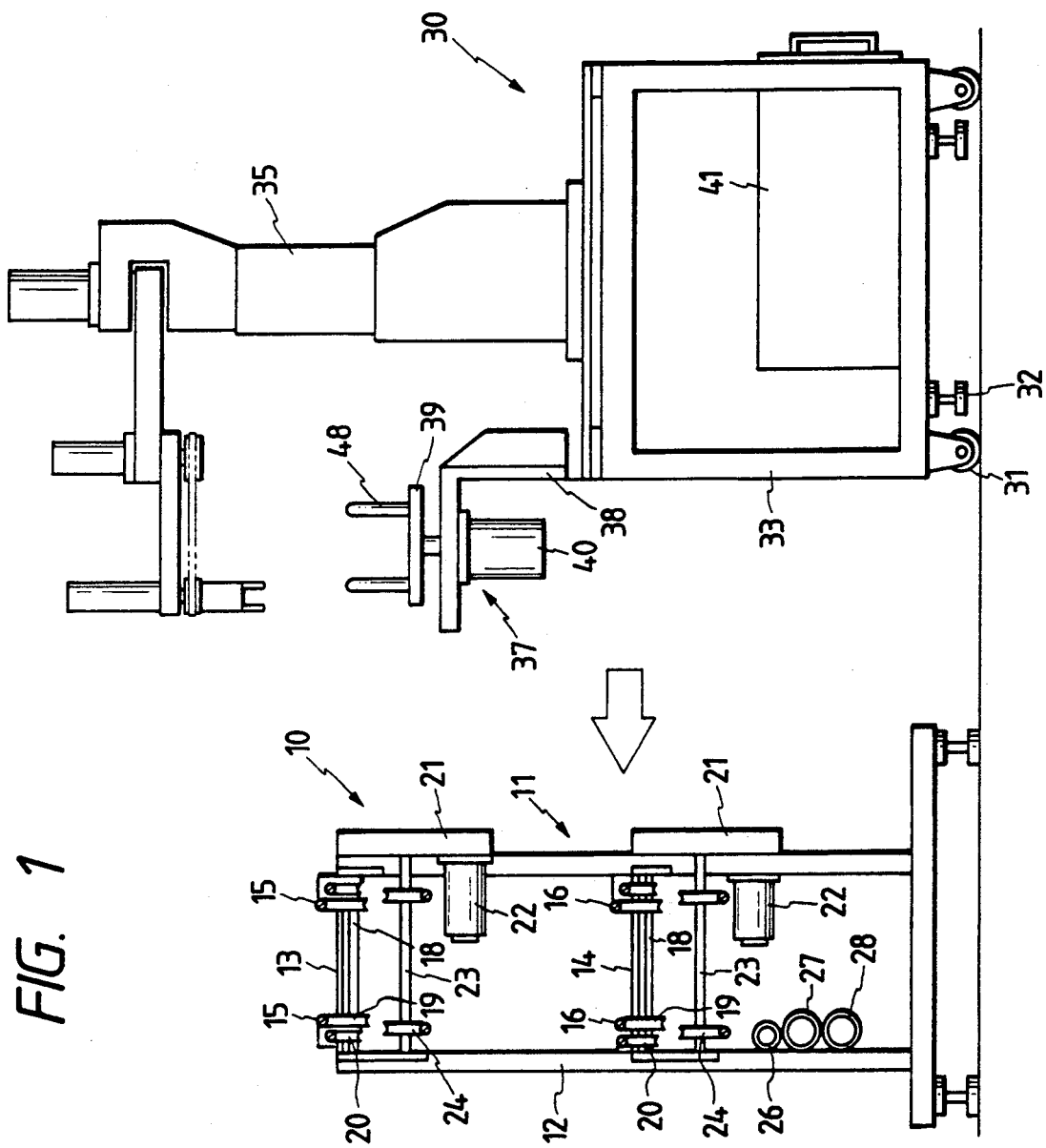
FIG. 1 is a side view of a parts assembling device constructed in accordance with a preferred embodiment of the present invention shown in a detached state.

FIG. 1 illustrates an embodiment of the present invention constructed as an assembling device for small parts such as a printing head for an impact dot printer. The device is generally divided into a pallet carrying unit 10 and a parts assembling unit 30 constructed so as to be detachably connected to the pallet carrying unit 10.

Figure 4:
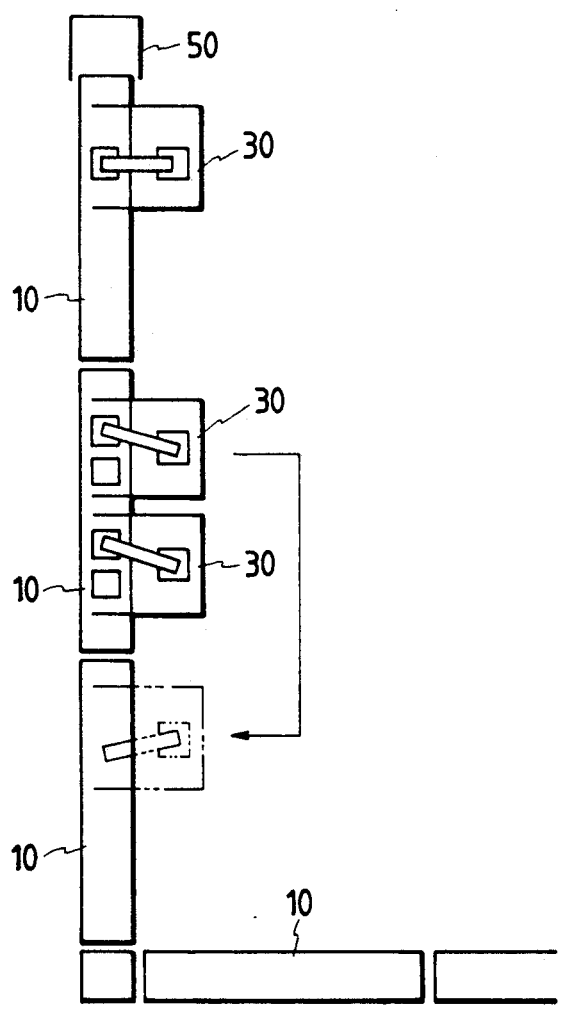
FIG. 4 is an explanatory view showing plural devices of the invention forming a parts assembling line.

The pallet carrying unit 10 is constructed, as shown in FIG. 4, as one of a plurality of individual units constituting a pallet carrying line. In other words, the pallet carrying unit 10 is constructed as a module including all elements required for the carrying of parts, such as pallet carrying belts 15 and their driving mechanism, a power cable 26, air pressure and air suction ducts 27 and 28, a pallet position detecting sensor, etc.

The pallet carrying unit 10 is constituted as a frame 11 having a constant length by longitudinal frames 12 at both ends and horizontal frames with an upper step 13 and middle step 14 extending therebetween. On the upper step 13 and the middle step 14 of the frame 11 are respectively suspended and mounted pairs of right and left pallet carrying belts 15, 15 and pallet recovery belts 16, 16 through pairs of right and left pulleys 19 attached to both ends of the frame 11.

Figure 3:
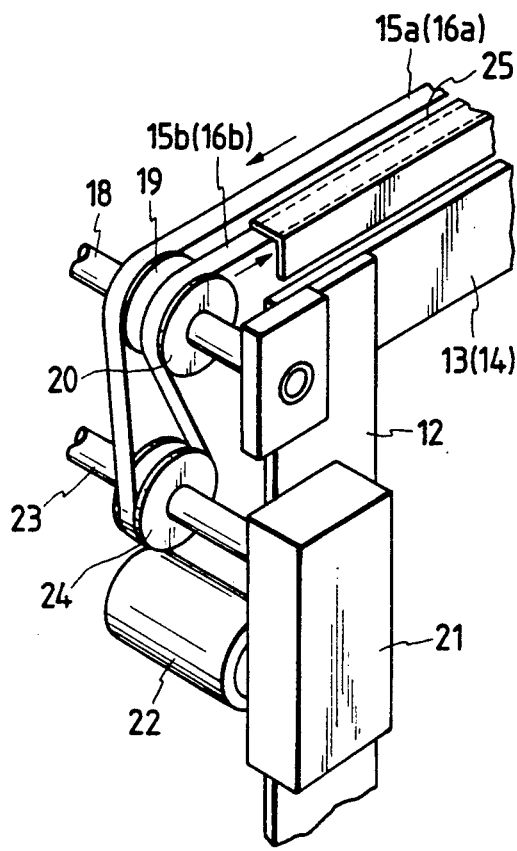
FIG. 3 is a perspective view showing a main part of the device.

FIG. 3 illustrates the driving arrangement of these belts. At both ends of the frame 11, pulley support shafts 18 are attached on the respective belt suspension portions of the upper step 13 and the middle step 14. On each shaft 18, larger diameter pulleys 19 on which the belt 15a (16a) of a pallet carrying side is entrained and smaller diameter pulleys 20 on which the belt 15b (16b) of a pallet return side is entrained are mounted so as to be freely rotatable.

At a lower portion of the shaft 18 there is provided a driving shaft 23 connected to a driving motor 22 through a speed reduction mechanism 21. The belt 15b (16b) of the pallet returning side from the smaller diameter pulleys 20 is entrained around driving pulleys 24 secured to the driving shaft 23. Then, the belt 15b (16b) passes over the larger diameter pulleys 19 so that the belt 15a (16a) of the pallet carrying side is made to travel on the upper step 13 and the middle step 14.

According to such a construction of the present invention, both the belts 15a, 15b (16a, 16b) turn with a small difference in height between the belt 15a (16a) on the carrying side and the belt 15b (16b) on the return side. Even when a pallet positioning mechanism 37 is inserted and positioned between these belts, as mentioned below, a space required for carrying and recovering a pallet P can be maintained.

Reference numeral 25 in the drawing designates a cover plate for covering the belt 15b (16b) on the return side.

In a space of a lower step of the pallet carrying unit 10, the respective air pressure and air suction ducts 27, 28 as well as the feeding cable 26 for feeding power to the parts assembling unit 30 are disposed in such a manner that they can be connected to the corresponding cable 26 and ducts 27, 28 of an adjacent pallet carrying unit 10. In addition, a sensor (not shown) for detecting the pallet is disposed at a suitable position on the surface for carrying the pallet.

On the other hand, the parts assembling unit 30 is constructed as a portable unit by the provision of casters 31 and anchoring legs 32. On a base 33 thereof, a suitable connector fitting is attached to a connecting side to be connected to the pallet carrying unit 10. On the upper face of the base, there is provided an articulated robot 35 which receives the parts from a feeder (not shown) disposed at a side opposite to the connecting side portion and assembles them on the workpiece mounted on a carrying pallet P.

On the base 33, the pallet positioning mechanism 37 is attached through a bracket 38 so as to protrude toward a side of its connecting face. The positioning mechanism 37 is adapted to be located between the upper step 13 and the middle step 14, while the parts assembling unit 30, which is connected to the one side of the pallet carrying unit 10, elevates the pallet P carried by the carrying belt 15, and positions and maintains it at a prescribed position of the parts assembling unit 30.

This pallet positioning mechanism 37, the structure of which is itself well known, includes a positioning and holding plate 39 having engagement pins 48 protruding from its upper face which engage with engagement holes of the pallet P, and an elevation cylinder 40 for upwardly and downwardly moving the positioning and holding plate 39. Further, on a part of the positioning and holding plate 39 there is provided an IC card reader (not shown) which is brought into contact with an IC card attached to the lower face of the pallet P to read information recorded on the IC card so that, based on the information read from the card, such as the type of workpiece carried by the pallet P or its tolerance, the correct type of parts to be assembled on the workpiece or parts meeting the tolerance can be selected and attached thereto.

Reference numeral 41 in the drawing designates a casing for housing a circuit substrate which is detachably secured to the base 33.

The assembling device for parts described above is formed, as shown in FIG. 4, in such a way that the individual pallet carrying units 10 constructed as modules are first connected to one another with a length necessary for assembling parts, elevators 50 for elevating pallets are disposed at both terminals, and the respective power cables 26 and the pipes 27, 28 for air pressure and air suction of the pallet carrying units 10 are connected with one another.

Figure 2:
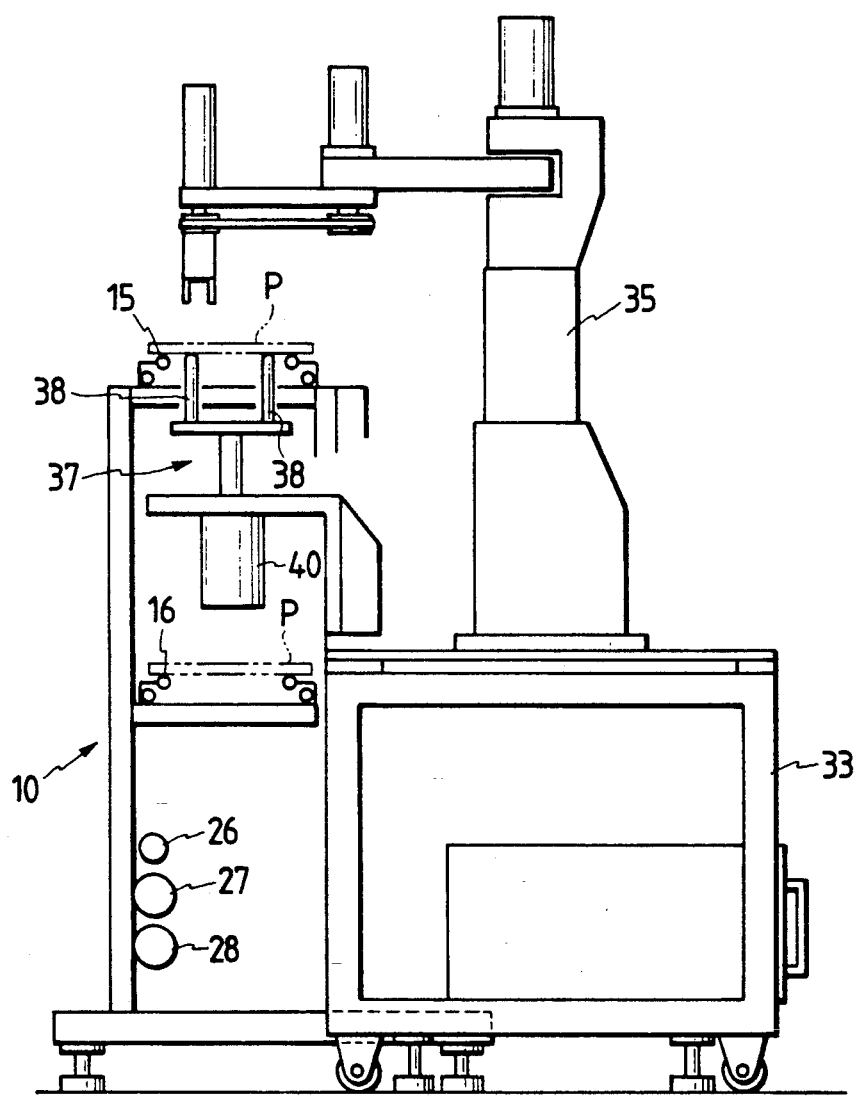
FIG. 2 is a side view of the device of FIG. 1 in a connected state.

Then, as shown in FIG. 2, each of the parts assembling units 30 is connected to the one side of each of the pallet carrying units 10, in accordance with a parts assembling process. Each of the pallet positioning units 37 protruding from the side of each of the parts assembling units is inserted and positioned between the upper step 13 and the middle step 14 of each of the pallet carrying units 10. Then, the pallet positioning unit is connected to the power cable 26 and the pipes 27, 28 for air pressure and air suction of the pallet carrying unit 10.

Consequently, each of the pallet carrying units 10 is united with each of the parts assembling units 30. The pallet P carried by the pallet carrying belt 15 of the pallet carrying unit 10 side is positioned and held by the pallet positioning mechanism 27 on the side of the parts assembling unit 30, and required parts are sequentially assembled on a workpiece mounted thereon.

In the case where the type of the workpiece is changed, the parts assembling unit 30, which cannot be adapted to the type of the workpiece, is removed from a carrying line and a parts assembling unit 30 prepared for the new type of workpiece is moved and connected to the pallet carrying unit 10 requiring it. Moreover, in the case where the assembling sequence of parts is changed because of a change in the type of workpiece, an objective parts assembling unit 30 is rearranged, as shown in FIG. 4, in order to deal with such circumstances.

As described above, according to the present invention, since the pallet positioning device can be connected to a required parts assembling position of the parts carrying unit constituting a part of a parts assembling line by positioning the pallet positioning device at an immediately lower portion of the pallet carrying belts, the formation of the assembly line can be easily changed in accordance with the type of workpiece. Furthermore, the replacement of a parts assembling unit by another unit in accordance with the type of workpiece or the rearrangement of the parts assembling units meeting the change of the assembling sequence, etc., can be readily carried out in short time. Therefore, the operation rate of the device can be improved and expenses required for the change can be greatly reduced.

What is claimed is:

1. An assembling device for parts comprising:
   at least one parts carrying unit comprising pallet carrying belts and means for supplying electrical power to a parts assembling unit, said parts carrying unit having one side formed to be connected to said parts assembling unit; and
   a parts assembling unit, said parts assembling unit being movably formed so as to be connectable to said one side of said parts carrying unit, said parts assembling unit comprising pallet positioning means capable of being placed at an immediately lower portion of said pallet carrying belts while said parts assembling unit is connected to said parts carrying unit, and assembling means for assembling parts on a workpiece mounted on a pallet carried on said pallet carrying belts.

2. The assembling device of claim 1, further comprising means for guiding and driving said belts such that a height of said belt in a pallet feeding direction is greater than a height of said belt in a return direction.

3. The assembling device of claim 2, wherein said guiding and driving means comprises at least one pair of pulleys of different diameters.

4. The assembling device of claim 1, wherein a plurality of said parts carrying units are provided connected end to end with one another.

5. The assembling device of claim 1, wherein said pallet positioning comprises a pair of longitudinal frames disposed at respective opposite ends of said parts carrying unit, and horizontal frames extending between said longitudinal frames, said horizontal frames comprising an upper step and a middle step.

* * * * *